United States Patent
Hong et al.

(10) Patent No.: US 10,210,421 B2
(45) Date of Patent: Feb. 19, 2019

(54) APPARATUS AND METHOD FOR OBJECT TRACKING

(71) Applicants: TOYOTA MOTOR ENGINEERING & MANUFACTURING NORTH AMERICA, INC., Erlanger, KY (US); UNIVERSITY OF TECHNOLOGY, SYDNEY, Ultimo (AU)

(72) Inventors: Zhibin Hong, Sydney (AU); Xue Mei, Ann Arbor, MI (US); Zhe Chen, Sydney (AU); Chaohui Wang, Bussy-Saint-Georges (FR); Danil Prokhorov, Canton, MI (US); Dacheng Tao, Ultimo (AU)

(73) Assignees: Toyota Motor Engineering & Manufacturing North America, Inc., Erlanger, KY (US); UNIVERSITY OF TECHNOLOGY, SYDNEY, Ultimo (AU)

( * ) Notice: Subject to any disclaimer, the term of this patent is extended or adjusted under 35 U.S.C. 154(b) by 0 days.

(21) Appl. No.: 15/454,453

(22) Filed: Mar. 9, 2017

(65) Prior Publication Data
US 2017/0185860 A1    Jun. 29, 2017

Related U.S. Application Data

(63) Continuation of application No. 14/716,661, filed on May 19, 2015, now Pat. No. 9,613,273.

(51) Int. Cl.
*G06K 9/00* (2006.01)
*G06K 9/46* (2006.01)
(Continued)

(52) U.S. Cl.
CPC ....... *G06K 9/4604* (2013.01); *G06K 9/00624* (2013.01); *G06K 9/46* (2013.01);
(Continued)

(58) Field of Classification Search
CPC . G06T 2207/10016; G06T 2207/30236; G06T 2207/30241; G06T 7/2033;
(Continued)

(56) References Cited

U.S. PATENT DOCUMENTS

| | | |
|---|---|---|
| 6,295,367 B1 | 9/2001 | Crabtree et al. |
| 7,436,887 B2 | 10/2008 | Yeredor et al. |

(Continued)

FOREIGN PATENT DOCUMENTS

GB    2253109    8/1992

OTHER PUBLICATIONS

Z. Kalal, K. Mikolajczyk, and J. Matas. Tracking-LearningDetection. TPAMI, 34(7):1409-1422, 2012.
(Continued)

*Primary Examiner* — Aklilu Woldemariam
(74) *Attorney, Agent, or Firm* — Oblon, McClelland, Maier & Neustadt, L.L.P.

(57) ABSTRACT

An object tracking device includes a short-term processing portion and a long short-term processing portion that are implemented by circuitry and work in a collaborative manner to track an object. The short-term processing portion includes a filter that tracks the object based on short-term memory and spatiotemporal consistency. The long short-term processing portion performs key-point matching-tracking and estimation based on a key-point database in order to track the object. A controller determines an output of the object tracking device based on the processing conducted by the short-term and long short-term processing portions of the tracking device, respectively.

15 Claims, 7 Drawing Sheets

(51) Int. Cl.
*G06T 3/40* (2006.01)
*G06K 9/52* (2006.01)
*G06T 7/246* (2017.01)
*G06T 7/277* (2017.01)
*G06K 9/62* (2006.01)

(52) U.S. Cl.
CPC .......... *G06K 9/52* (2013.01); *G06T 3/40* (2013.01); *G06T 7/246* (2017.01); *G06T 7/248* (2017.01); *G06T 7/277* (2017.01); *G06K 9/00* (2013.01); *G06K 9/6267* (2013.01); *G06K 2009/4666* (2013.01); *G06T 2207/20081* (2013.01)

(58) Field of Classification Search
CPC ..... G06T 7/0028; G06T 7/0042; G06T 17/00; G06T 7/0022; G06T 7/0081; G06T 3/4053; G06T 7/60; G06T 2207/20081; G06T 2207/30232; G06T 7/2006; G06T 7/204; G06T 7/2066; G06T 7/004; G06T 7/20; G08B 13/19608; G08B 13/19602; G06K 9/00771; G06K 9/4671; G06K 9/6269; G06K 9/3233; G06K 9/6255; G06K 9/00288; G06K 9/00744; G06K 9/3241; G06K 9/3258; G06K 9/6256; G06K 9/00818; G06K 9/527; G06K 9/00268; G06K 9/46; G06K 9/629; G06K 9/00624; G06K 9/4676; G06K 9/00281; G06K 9/621; G06K 9/00711; G06K 9/00718; G06K 9/00765; G06K 9/66; G06K 9/6211; G01S 3/7864; G01S 3/7865; H04N 1/00196; H04N 1/00307; H04N 1/2133; H04N 1/32101; H04N 1/603; H04N 1/6077; H04N 9/73; G06F 3/005; G06F 3/0304; G06F 3/048; G06F 17/30277; G06F 17/3087; A63F 13/2145; A63F 2300/69; G01C 21/12; A61B 8/5223
USPC ....... 382/103, 107, 131, 158, 159, 190, 201, 382/224
See application file for complete search history.

(56) References Cited

U.S. PATENT DOCUMENTS

| | | | |
|---|---|---|---|
| 8,189,905 B2 | 5/2012 | Eaton et al. | |
| 8,218,818 B2 | 7/2012 | Cobb et al. | |
| 8,218,819 B2 | 7/2012 | Cobb et al. | |
| 8,670,604 B2 | 3/2014 | Eggert et al. | |
| 8,687,891 B2* | 4/2014 | Takacs | G06K 9/4642 382/190 |
| 9,449,392 B2* | 9/2016 | Han | G06K 9/6259 |
| 2003/0115165 A1* | 6/2003 | Hoya | G06N 3/0454 706/15 |
| 2004/0240542 A1* | 12/2004 | Yeredor | G06K 9/00771 375/240.01 |
| 2007/0249953 A1* | 10/2007 | Frei | A61N 1/36082 600/544 |
| 2009/0318773 A1* | 12/2009 | Jung | G16H 10/20 600/300 |
| 2010/0054540 A1* | 3/2010 | Brown | G06K 9/00369 382/107 |
| 2010/0189354 A1* | 7/2010 | de Campos | G06K 9/00597 382/190 |
| 2010/0226564 A1* | 9/2010 | Marchesotti | G06F 17/30256 382/159 |
| 2011/0129119 A1* | 6/2011 | Eggert | G06T 7/20 382/103 |
| 2011/0170780 A1* | 7/2011 | Vaddadi | G06K 9/4671 382/190 |
| 2011/0299770 A1* | 12/2011 | Vaddadi | G06K 9/6211 382/165 |
| 2012/0011142 A1* | 1/2012 | Baheti | G06K 9/4671 707/769 |
| 2012/0027290 A1* | 2/2012 | Baheti | G06K 9/4671 382/154 |
| 2012/0164613 A1* | 6/2012 | Jung | G06Q 30/02 434/236 |
| 2013/0061156 A1* | 3/2013 | Olsen | G06Q 50/01 715/753 |
| 2014/0010407 A1* | 1/2014 | Sinha | G06K 9/00664 382/103 |
| 2014/0028850 A1 | 1/2014 | Keating et al. | |
| 2014/0192210 A1* | 7/2014 | Gervautz | G06K 9/228 348/207.1 |
| 2014/0226864 A1* | 8/2014 | Venkatraman | G01C 21/20 382/107 |
| 2014/0233800 A1* | 8/2014 | Kis | G06K 9/00744 382/103 |
| 2014/0270346 A1 | 9/2014 | Tsin et al. | |
| 2014/0279860 A1* | 9/2014 | Pan | G06F 17/30277 707/609 |
| 2015/0138223 A1* | 5/2015 | Sorkine Hornung | H04N 1/603 345/591 |
| 2016/0125261 A1* | 5/2016 | Balestri | G06K 9/6255 382/201 |

OTHER PUBLICATIONS

M. Danelljan, G. H"ager, F. S. Khan, and M. Felsberg. Accurate Scale Estimation for Robust Visual Tracking. BMVC, 2014.

J. F. Henriques, R. Caseiro, P. Martins, and J. Batista. Highspeed tracking with kernelized correlation filters. arXiv preprint arXiv:1404.7584, 2014.

F. Pernici and A. Del Bimbo. Object Tracking by Oversampling Local Features. TPAMI, 36(12):2538-2551, 2014.

* cited by examiner

APPARATUS AND METHOD FOR OBJECT TRACKING

CROSS-REFERENCE TO RELATED APPLICATIONS

This application is a continuation application of U.S. patent application Ser. No. 14/716,661 filed May 19, 2015, the contents of which are hereby incorporated by reference in its entirety.

FIELD OF DISCLOSURE

The present disclosure relates generally to object tracking. Specifically, the present disclosure relates to an object tracking device that employs a dual component approach for processing and tracking objects.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Variations in the appearance of a tracked object, such as changes in geometry, photometry, camera viewpoint, illumination, or partial occlusion, pose a major challenge to object tracking. The object tracking devices developed thus far can primarily be classified into two categories: short-term tracking devices and long-term tracking devices, respectively.

Short-term tracking devices are based on a short-term memory model and employ techniques such as incremental learning of a low-dimensional subspace of the target representation and sparse representation of tracking. The short-term memory of the target appearance is modelled using a small set of target instances and discriminative techniques that consider both background and foreground information. Short-term tracking devices depend on spatiotemporal consistency of visual clues and tend to be inefficient in complex object tracking applications.

In contrast, long-term tracking devices employ a long-term memory model and can be differentiated based on their choice of appearance models and inference algorithms. A long term object tracker such as the tracking-learning and detection (TLD) tracker employs two experts to identify the false negatives and false positives in order to train the detector. Additionally, some long term trackers model target appearances using oversampled local features, whereas other long term trackers are based on self-paced learning schemes in which the target appearance is learned by selecting trustworthy frames. A drawback of the above long term trackers is that they update the appearance model in a rather conservative manner and are thus not able to handle fast appearance changes that occur in a short time period.

Accordingly, there is a requirement for an object tracking device that addresses the above stated drawbacks of object trackers and boosts tracking performance.

SUMMARY

An object tracking device according to an exemplary embodiment, boosts tracking performance and addresses problems of complex object tracking, wherein the object may become occluded or leave the field-of-view. Specifically, the present disclosure provides for an object tracking device that adapts to changes in object appearances during tracking. The object tracking device (referred to herein as a multi-store tracker) is based on the Atkinson-Shiffrin memory model. The multi-store tracker includes one short-term memory store component and one long-term memory store component, which collaboratively process the input image and track the object.

According to one embodiment, an integrated correlation filter (ICF) that stores short-term memory and depends on spatiotemporal consistency is employed in the short-term store to perform short-term tracking via a two-stage filtering process. Additionally, the multi-store tracker includes a long-term memory component that is based on key-point matching-tracking and random-sample-consensus (RANSAC) estimation. The long-term memory component interacts with a key-point feature database and controls the final output as well as the short-term memory states. Further, in order to maintain a reasonable size for the key-point feature database, the multi-store tracker updates the key-point feature database based on a forgetting curve model, thereby retaining only the useful object features.

The foregoing paragraphs have been provided by way of general introduction, and are not intended to limit the scope of the following claims. The described embodiments together, with further advantages, will be best understood by reference to the following detailed description taken in conjunction with the accompanying drawings.

BRIEF DESCRIPTION OF THE DRAWINGS

Various embodiments of this disclosure that are provided as examples will be described in detail with reference to the following figures, wherein like numerals reference like elements, and wherein.

DETAILED DESCRIPTION OF EMBODIMENTS

Figure 1:
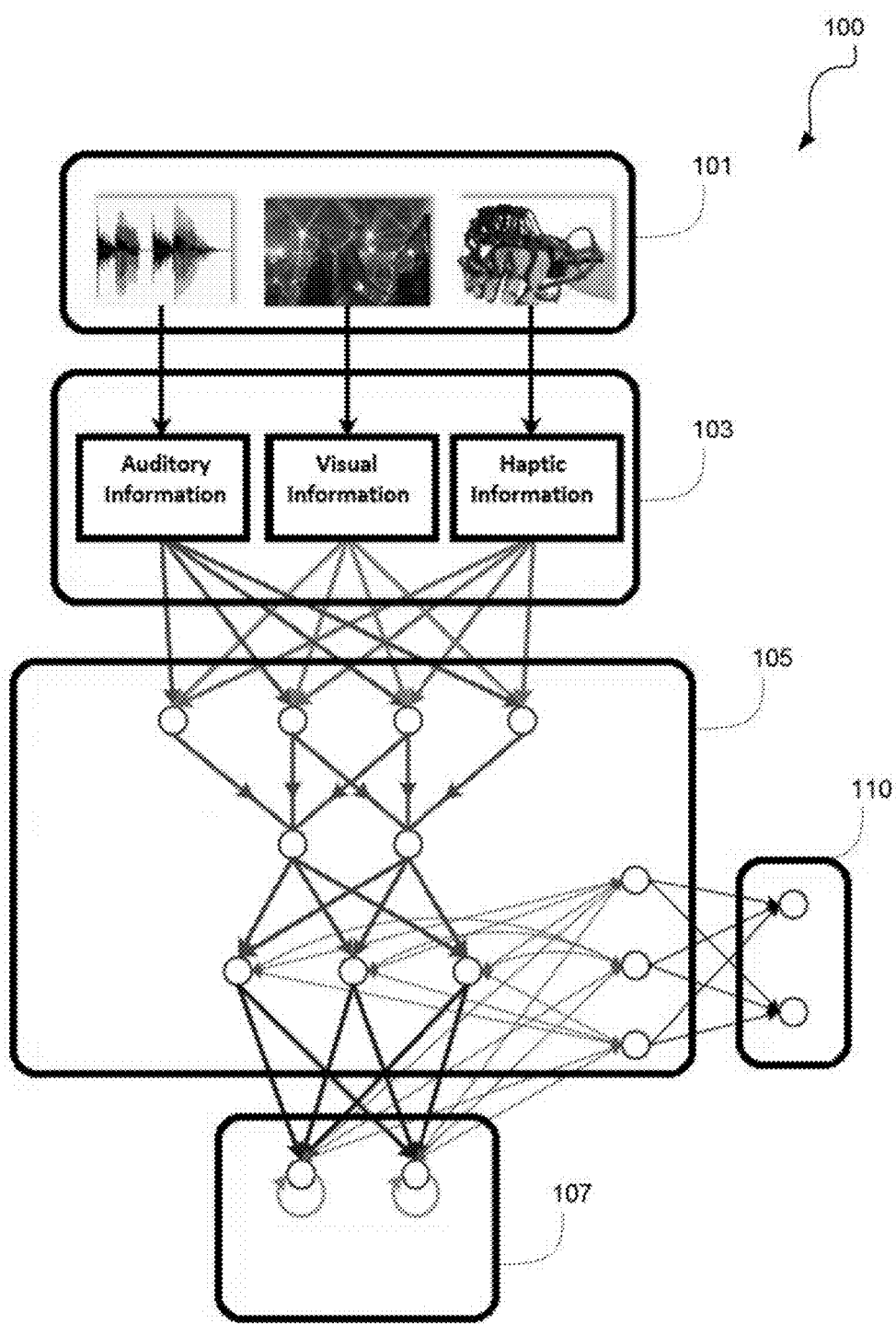
FIG. 1 depicts an exemplary schematic diagram illustrating an Atkinson-Shiffrin memory model.

Exemplary embodiments are illustrated in the referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

Humans respond quickly to visual information by recognizing temporal consistency and memorizing useful visual features to recover from tracking failures when the target leaves the field-of-view. Memory is one of the most powerful, but least well understood, functions of the human brain. With the sophisticated memory system, humans are capable of adapting to complex environments and behaving stably and consistently when facing temporal issues.

Accordingly, the present disclosure exploits the principles of biological memory to design a solution that address the problem faced in object tracking. Specifically, the object tracking device of the present disclosure is based on the Atkinson-Shiffrin's memory model.

An aspect of the present disclosure provides an object tracking device comprising: a first tracker implemented by circuitry configured to: determine and extract features, of a candidate image patch from an input image frame, evaluate the candidate image patch and cyclically shifted image patches of the candidate image patch to determine a location of a tracked object, resize and extract features from a predetermined number of image patches surrounding the determined location, to determine a first instance of the tracked object. Further, the object tracking device comprises a second tracker implemented by circuitry that is configured to: detect a plurality of key-points from the input image frame, classify, based on a key-point database, each detected key-point as one of a matched target key-point, a matched background key-point, and an unmatched key-point, compute, based on consecutive input image frames, an active set of key-points, and estimate, based on the computed active set of key-points and the matched target key-points, a set of inlier key-points included in a target bounding box that corresponds to a second instance of the tracked object. The object tracking device also includes a controller that is configured to generate a tracked object based on consistency of the first instance of the tracked object and the second instance of the tracked object.

According to one embodiment, is provided a method of object tracking. The method includes: determining, and extracting features of a candidate image patch, from an input image frame, evaluating by circuitry, the candidate image patch and cyclically shifted image patches of the candidate image patch, to determine a location of a tracked object; resizing, and extracting features, from a predetermined number of image patches surrounding the determined location to obtain a first instance of the tracked object; detecting a plurality of key-points from the input image frame, classifying, based on a key-point database, each detected key-point as one of a matched target key-point, a matched background key-point, and an unmatched key-point, computing by circuitry, based on consecutive input image frames, an active set of key-points, estimating, based on the computed active set of key-points and the matched target key-points, a set of inlier key-points included in a target bounding box that corresponds to a second instance of the tracked object; and generating by circuitry, a tracked object based on consistency of the first instance of the tracked object and the second instance of the tracked object.

According to one embodiment is provided a non-transitory computer readable medium having stored thereon a program that when executed by a computer causes the computer to execute a method to track an object. The method includes: determining, and extracting features of a candidate image patch, from an input image frame, evaluating the candidate image patch and cyclically shifted image patches of the candidate image patch, to determine a location of a tracked object; resizing, and extracting features, from a predetermined number of image patches surrounding the determined location to obtain a first instance of the tracked object; detecting a plurality of key-points from the input image frame, classifying, based on a key-point database, each detected key-point as one of a matched target key-point, a matched background key-point, and an unmatched key-point, computing based on consecutive input image frames, an active set of key-points, estimating, based on the computed active set of key-points and the matched target key-points, a set of inlier key-points included in a target bounding box that corresponds to a second instance of the tracked object; and generating a tracked object based on consistency of the first instance of the tracked object and the second instance of the tracked object.

Turning to FIG. 1, a schematic diagram illustrating the Atkinson-Shiffrin's memory model (ASMM) 100 is depicted according to an exemplary embodiment. The ASMM 100 is also referred to herein as a multi-store memory model. The ASMM 100 includes a sensory memory register 103, a short-term memory 105, and a long-term memory 107. Initially, environmental input signals 101 are delivered to the sensory memory register 103, at which point the original input signals are transformed into chemical and physical signals for processing within the biological system. The sensory memory register 103 includes environmental signals 101 that are transformed into auditory information, visual information, haptic information and the like.

The input information from the sensory register 103 is further transferred to the short-term memory 105, wherein the information undergoes the processes of encoding, rehearsing, retrieving, and responding, after which the memory model 100 can output a reasonable and appropriate response 110. The short-term memory 105 does not retain information for an extended period of time. Accordingly, a long-term memorizing of the information is performed in the long-term memory 107. Specifically, if a particular pattern is received repeatedly, the long-term memory 107 is activated and the pattern information is retained therein. Once memorized, the pattern is maintained for a certain period of time but forgotten if not reinforced. As a result, the information inside the long-term memory 107 is a stable and consistent representation of current event sequences.

By combining short-term processing (performed in the short term memory 105) and long-term maintenance (performed in the long term memory 107), the memory model 100 produces sensitive and stable responses to complex inputs. For instance, when the external environment is continuous and steady, the processing performed in the short-term memory 105 is fast and the multi-store memory model 100 produces immediate responses. On the other hand, if the memory model 100 encounters a sudden change in input, information remembered by the long-term memory 107 is retrieved, which helps to stabilize the output 110. In such a manner, the cooperation between the short-term memory 105 and the long-term memory 107 allows humans to take reasonable actions in response to different and changing environments. Further, it should be appreciated that the ASMM 100 as depicted in FIG. 1 includes processing nodes (and their connections) in the short-term memory 105 and long-term memory 107 that correspond to possible structures of a neural network within a human brain. The processing nodes included in the short-term memory 105 and the long-term memory 107 collaboratively process the input image in order to track the object.

Figure 2:
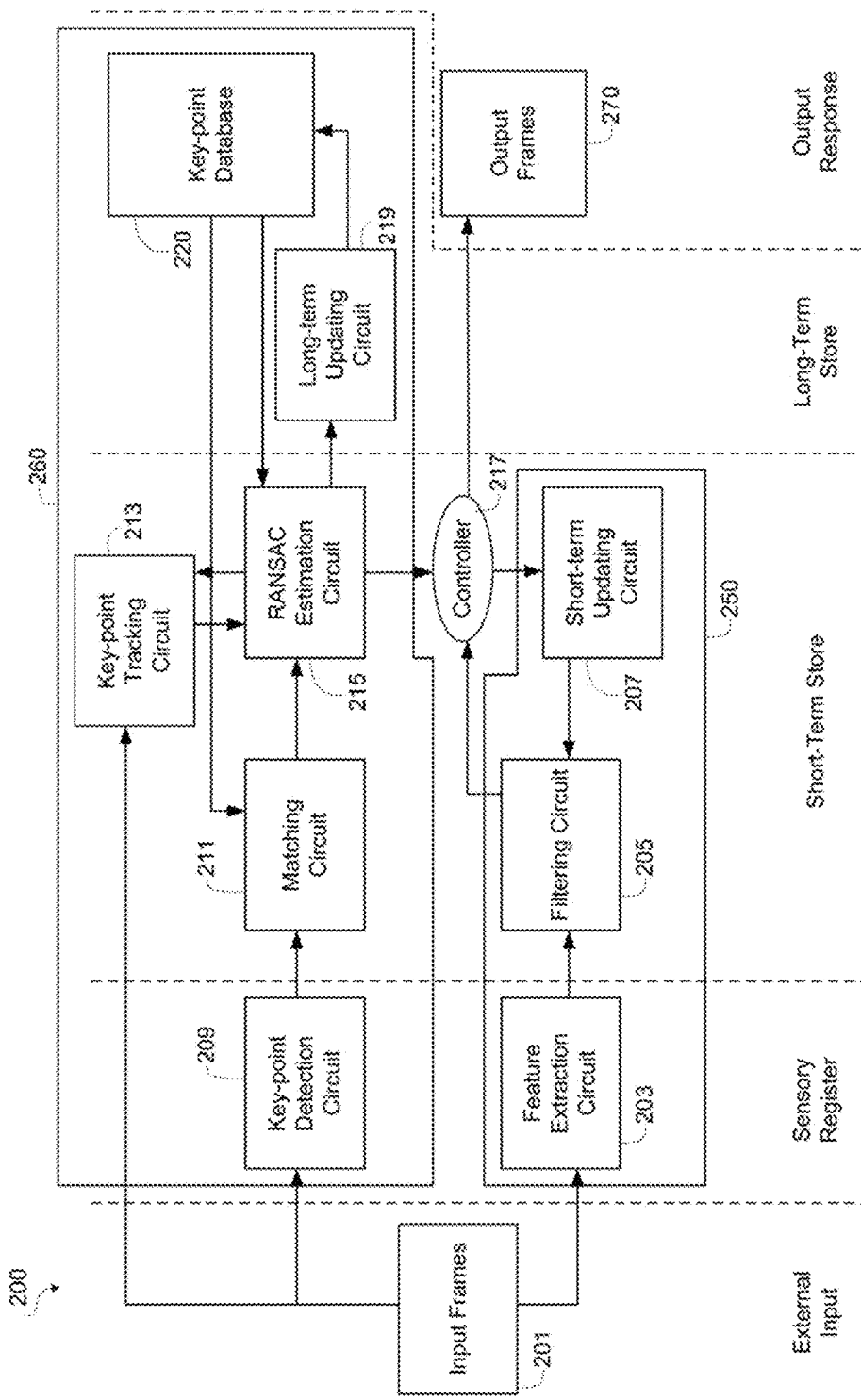
FIG. 2 depicts, according to an embodiment, a block diagram illustrating components of an object tracking device.

FIG. 2 depicts a block diagram illustrating components of an object tracking device (referred to herein as a multi-store tracker) 200 according to an exemplary embodiment. The multi-store tracker 200 is based on the ASMM shown in FIG. 1. As shown in FIG. 2, the framework of the multi-store tracker 200 can be divided into five portions, which include an external input, a sensory register, a shot-term store (i.e., a short term memory component), a long-term store (i.e., a long-term memory component), and an output response portion. Thus, the framework of the multi-store tracker 200 is based on the ASMM model depicted in FIG. 1. Further, as shown in FIG. 2, the processing of input image frames performed by the multi-store tracker 200 can be divided into a short-term processing portion 250 and a long short-term processing portion 260, which collaboratively process the sequential input image frames 201 in order to track an object and generate the output frames 270. According to an embodiment, the functions of the short-term processing portion 250 and the long short-term processing portion 260 may be implemented by one or more processing circuits. A processing circuit includes a programmable processor (described later with reference to FIG. 6).

The short-term processing portion 250 includes a feature extraction circuit 203, filtering circuit 205, and a short-term updating circuit 207. The feature extraction circuit 203 is configured to extract certain features (such as histogram of oriented gradient and color attribute features) that are further processed by the filtering circuit 205, in order to track an object included in the image. According to one embodiment, the filtering circuit 205 may include an integrated correlation filter (ICF) that performs short-term processing via a two-stage filtering process and tracks the target (i.e., object to be tracked) based on short-term memory and spatiotemporal consistency. In a relatively stable environment, the ICF performs accurate object tracking.

The multi-store tracker 200 also includes a long short-term processing portion 260 that performs image processing based on keypoint matching-tracking and random sample consensus (RANSAC) estimation. The long short-term processing portion 260 of the multi-store tracker 200 includes a key-point detection circuit 209, matching circuit 211, a keypoint tracking circuit 213, a RANSAC estimation circuit 215, a long-term updating circuit 219, and a key-point database 220. As described below, the matching circuit 211, key-point tracking circuit 213, and the RANSAC estimation circuit 215 are configured to conduct long short-term processing of the image on the fly. The matching circuit 211, the key-point tracking circuit 213, and the RANSAC estimation circuit 215 perform key-point matching, key-point tracking, RANSAC estimation, and further interact with the short-term memory using a forward-backward tracking technique. Further, the matching circuit 211, the key-point tracking circuit 213, and the RANSAC estimation circuit 215 retrieve the long term memory for matching (from the key-point database 220) and update (via the long-term updating circuit 219) the long-term memory based on the RANSAC estimation results and a forgetting curve model.

According to an embodiment of the present disclosure, during tracking, the outputs of both the short-term processing portion 250 and the long short-term processing portion 260 are transmitted to a controller 217 that is implemented by circuitry and configured to determine the final output frames 270 of the multi-store tracker 200. The controller 217 is further configured to update parameters of the filtering circuit 205 in an interpolating manner with a predetermined learning rate. The controller 217 updates the filter parameters via the short-term updating circuit 207. Specifically, the filtering circuit 205 that is included in the short-term store is reset when the output of the short-term processing portion 250 is highly inconsistent with the output of the long short-term processing portion 260. In doing so, the multi-store tracker 200 of the present disclosure is provided with an advantageous ability of recovering short-term tracking after dramatic appearance changes such as severe occlusion, the object leaving field-of-view, object rotation and the like.

In what follows, a detailed description of the operation of the multi-store tracker 200 is provided. Specifically, the operation of the short-term processing portion 250 and the long short-term processing portion 260, as well as the collaboration thereof in order to track the object is provided.

The processing conducted in the short-term processing portion 250 includes a two stage filtering process performed by the filtering circuit 205. The processing conducted in the long short-term processing portion 260 includes the processing of key-points by the matching circuit 211, the key-point tracking circuit 213, and the RANSAC estimation circuit 215. Further, the key-point database 220 is updated via the long-term updating circuit 219 based on a forgetting curve model. Additionally, the operation of the controller 217 in updating the filtering circuit 205 (via the short-term updating circuit 207), as well as in determining the output of the multi-store tracker 200 is provided.

The short-term processing portion 250 of the multi-store tracker 200 can be used to provide instant responses to the input image frames based on short-term memory. For accurate and efficient short-term processing performance, Integrated Correlation Filters (ICFs), which are based on the Kernelized Correlation Filters (KCFs) and Discriminative Scale Space Correlation Filter (DSSCF) are employed in the short-term processing portion 250 of the multi-store tracker 200. The ICF includes a two-stage filtering process that performs translation estimation and scale estimation, respectively. Specifically, the ICF serves as a short-term component of the multi-store tracker 200, wherein the short-term memory of ICF includes the coefficients and templates for the filters.

The KCF is defined by a classifier $f(x) = \langle w, \emptyset(x) \rangle$, that is trained on a M×N image patch x, centered by the center of a target bounding box $B_T$ and is p times larger than $B_T$. According to one embodiment, instead of using dense sliding windows to extract training samples, the classifier considers $x_i$, which are all the cyclic shift versions of x, for training, where $i \in \{0, 1, 2, \ldots, M-1\} \times \{0, 1, 2, \ldots, N-1\}$. Each example $x_i$ is assigned a regression score $y_i \in [0, 1]$ that is generated by a Gaussian function in terms of the shifted distance. The classifier is trained by minimizing the regression error:

$$\min_w \sum_i (\langle w, \emptyset(x_i) \rangle - y_i)^2 + \lambda \|w\|^2 \qquad (1)$$

where $\emptyset(x)$ is a mapping to a Hilbert space, and $\lambda \geq 0$ is a regularization parameter that controls the simplicity of the tracker. Further, by employing a kernel $\kappa(x, x') = \langle \phi(x), \phi(x') \rangle$ the classifier can be derived as $f(x) = \Sigma_i \alpha_i \kappa(x_i, x)$, where $\alpha$ is the dual variable of w. For sake of simplicity, the Discrete Fourier transform (DFT) of a vector is represented with a hat "^" notation, e.g., $\hat{\alpha} = \mathcal{F}(\alpha)$, and its complex conjugate is represented as $\hat{\alpha}^*$. Thus, if the kernel is shift invariant, for instance an RBF kernel, $\hat{\alpha}^*$ can be computed based on the properties of circulant matrices:

$$\hat{\alpha}^* = \frac{\hat{y}}{\hat{k}^{xx} + \lambda'} \qquad (2)$$

where $k^{xx}$ is a vector whose $i^{th}$ element is $(x_i, x)$. In particular, for image data with C feature channels, a concatenation $x = [x^1; \ldots; x^C]$ can be constructed, and the kernel correlation $k^{xx}$ based on a Gaussian kernel can be efficiently computed by element-wise products and summation over the feature channels in the Fourier domain:

$$k^{xx'} = \exp\left(-\frac{1}{\alpha^2}\left(\|x\|^2 + \|x'\|^2 - 2\mathcal{F}^{-1}\left(\sum_{c-1}^{C}\hat{x}^c \odot (\hat{x'}^c)^*\right)\right)\right) \quad (3)$$

where the dot operator denotes element-wise products, and c denoted the index of the feature channels.

As stated previously, the ICF includes two stages of filtering: a first stage filtering that performs translation estimation and a second stage filtering that performs scale estimation. According to an embodiment, translation estimation is defined herein as an estimate of the translation location of the target, assuming no scale change. During the first-stage filtering for translation estimation, given a M×N candidate image patch z as the search space, all the cyclic patches of z can be evaluated as:

$$f(z) = \mathcal{F}^{-1}((\hat{k}^{xz})^* \odot \hat{\alpha}) \quad (4)$$

where f(z) is the filtering response for all the cyclic versions of z, and the translation is estimated by finding the location with the highest response. The candidate image patch z can be centered using the tracking result $B_O$ of the last frame. Further, in order to adapt to the short-term appearance changes of the target, the filter coefficients α and the target template x are updated in an interpolating manner with a learning rate γ. Note that the target template is initialized (when the short-term component is rest) as an image patch x centered by the center of the target bounding box.

According to an embodiment, the multi-store tracker employs a 31-dimensional histogram of oriented gradients (HOG) as feature descriptors to detect the target. Specifically, the HOGs count occurrences of gradient orientation in localized portions of the image. Additionally, for color image sequences, additional 10-dimensional color attributes can be extracted to serve as complementary features, which are combined with the HOG descriptors to boost performance.

Thus, in order to perform translation estimation, the ICF determines a candidate image patch from the current image frame and extracts the HOG and color attributes features from the candidate patch. Note that the candidate patch is selected as the patch that is centered by the center of the target bounding box determined in the previous image frame. Further, upon determining the candidate image patch, the ICF evaluates the candidate image patch as well as all the cyclically shifted versions of the candidate image patch by using equation (4). Upon filtering the candidate image patch and its cyclic image patch versions, the position shift in the target (i.e., translation estimation) is performed by determining the location that has the highest filter response (i.e. a highest regression score).

Further, in order to address the scale-change issue of the detected target (object), a one-dimensional DSSCF can be trained to perform the second-stage filtering for scale estimation. According to one embodiment, a DSSCF is employed to perform scale estimation. Specifically, S image patches that are centered around the location found by the KCF filter are cropped from the image. Each of the cropped image patches has a size of $a^s M_T \times a^s N_T$, where $M_T \times N_T$ is the current size of the target, a is a scalar factor, and $$s \in \left\{-\frac{S-1}{2}, \ldots, \frac{S-1}{2}\right\}.$$

Further, all the S image patches are resized to the template size for feature extraction. The final output Bs from the short-term processing portion of the multi-store tracker is the image patch with the highest filtering response. It should be appreciated that similar to KCF, the model parameters of the DSSCF are also updated in an interpolating manner with a learning rate of μ.

One goal of the long-term processing portion 260 of the multi-store tracker 200 can be to conservatively learn the appearance of the target and to refresh the short-term memory when a mistake made by the short-term processing portion 250 of the multi-store tracker is detected. Further, Local Scale-Invariant Features (LSIFs), also referred to herein as key-points are used in the long-term processing portion of the multi-store tracker. Specifically, the long-term processing portion of the multi-store tracker performs key-point matching-tracking and RANSAC estimation in order to take advantage of the flexibility and shape generalizability of the key-point based appearance models.

The long-term memory of the target appearance can be modeled by a total feature database M=Γ∪B, that includes a foreground (target) feature database Γ and a background feature database B:

$$\Gamma = \{(d_i, p_i^o)\}_{i=1}^{N_\Gamma}; \; B = \{d_i\}_{i=1}^{N_B} \quad (5)$$

Here, $d_i \in \mathbb{R}^{128}$ is a 128-dimensional Scale-invariant Feature Transform (SIFT) descriptors of the key-points. $N_\Gamma$ and $N_B$ are the respective numbers of descriptors. Each target descriptor $\{d_i\} \in \Gamma$ is also associated with the corresponding coordinates $p_i^o \in \mathbb{R}^2$ that remember the keypoint location in the original target template, and can be used for estimating the transformation of target state. The background feature database enables a reduction in erroneous matching of target key-points and can help to detect the occlusions as described later.

In addition to the filtering function of ICF, another short-term procedure which can be conducted in the short-term store is to consecutively process the key-points by retrieving the long-term memory stored in M and the short-term memory stored in an active set. In each frame, a SIFT detector that is based on the difference of Gaussians, is applied to an image search area to extract a set of key-points with large responses. The set of detected key-points associated with their SIFT descriptors is denoted as $P_D = \{(d_k, p_k)\}_{k=1}^{N_D}$, where $p_k \in \mathbb{R}^2$ is the coordinates of the key-point.

The multi-store tracker 200 can perform key-point matching by searching the total memory database M for the nearest neighbors of each $d_k \in P_D$, based on the Euclidean distance.

A matching confidence of $d_k$ and its nearest neighbor $d_k^{1N}$ is defined herein as the Cosine similarity C ($d_k$, $d_k^{1N}$) between the two descriptors. The candidate matching keypoint can be found if the matching confidence is larger than a predefined threshold, denoted as $\theta_T$ for matching of target points and $\theta_B$ for matching of background points. Different threshold settings can be used to control the different recalls for the matching of foreground and background key-points. However, it should be appreciated that the matching of target points is significant since they are used to estimate the current state of the target. Thus, it is important to reject outliers during target point matching.

In order to further reject outliers, the multi-store tracker 200 can employ the distinct non-parametric nearest neighbor classifier by computing a ratio of the distances:

$$r(d_k) = \frac{d(d_k, d_k^{1N})}{d(d_k, d_k^{2N})} \quad (6)$$

where $d_k^{2N}$ is the second nearest neighbor of $d_k$. The matched point $d_k^{1N}$ is classified as an inlier if the ratio of distances $r(d_k)$ is smaller than a threshold $\theta_r$. Thus, the detected feature points $(d_k, p_k) \in P_D$, can be classified into one of the three following sets: the matched target key-points $P_T$, the matched background key-points $P_B$ and unmatched key-points $P_N$, as shown below:

$$\begin{cases} p_k \in P_T, d_k^{1N} \in \Gamma, C(d_k, d_k^{1N}) > \theta_\tau, \ r(d_k) < \theta_\tau \\ p_k \in P_B, d_k^{1N} \in B, C(d_k, d_k^{1N}) > \theta_B \\ p_k \in P_N, \quad \text{otherwise} \end{cases} \quad (7)$$

The multi-store tracker, upon matching the target key-points $(d_k, P_k) \in P_T$, extracts their corresponding coordinates $p_k^o$ from the original template and adds them to $P_T$ in order to obtain the complete form i.e., $P_T = \{(d_k, p_k^o, p_k)\}_{k=1}^{N_m}$.

As stated previously, the multi-store tracker performs key-point matching-tracking and RANSAC estimation in the long short-term processing portion 260 of the multi-store tracker 200. The long short-term processing portion 260 interacts with a short-term memory of the multi-store tracker 200 using a forward-backward tracking technique. Specifically, the tracker maintains an active set of key-points $P_A^{t-1} = \{(p_i^o, p_i^{t-1})\}_{i=1}^{N_A}$, where $p_i^{t-1}$ is the coordinates of the point in the $t-1$ frame and $p_i^o$ is the corresponding coordinates of $p_i^{t-1}$ in the original template. Note that the active set of key-points can be regarded as the short-term memory of the multi-store tracker that provides additional information for performing the long short-term processing.

In order to obtain the coordinates of $p_i^{t-1}$ in frame $I_t$, the multi-store tracker can employ the Lucas-Kanade (LK) method to determine the optical flow. Further, to increase robustness, the multi-store tracker can employ a Forward-Backward (FB) tracker to obtain a set of key-points with reliable tracking results. In the FB tracker, the forward optical flow from $p_i^{t-1}$ to $p_i^t$ and the backward optical flow from $p_i^t$ to $p'_i^{t-1}$ are computed using two consecutive frames: $I_{t-1}$ and $I_t$. The displacement $d(p_i^{t-1}, p'_i^{t-1})$ between $p_i^{t-1}$ and $p'_i^{t-1}$ is used to identify any tracking failures. Note that the displacement $d(p_i^{t-1}, p'_i^{t-1})$ should be small if the tracking is successful. Accordingly, in one embodiment, for a predetermined threshold $\theta_{fb}$, a failure in tracking is detected if $d(p_i^{t-1}, p'_i^{t-1}) > \theta_{fb}$. Thus, the multi-store tracker maintains a set of active key-points $(P_A^t = \{(p_i^o, p_i^t)\}_{i=1}^{N'_A}$ that are successfully tracked by the FB tracker.

Once the matched and tracked key-points are obtained, a candidate set $P_C$ can be formed that includes key-points in $P_T$ and $P_A^t$. This set is used to estimate the state of the target. In estimating the state of the target, only similarity transformation is applied as it is more reliable than homography transformation for tracking generic objects. For the case of similarity transformation, the state of the target can be defined as $s_t = \{x_t; y_t; s_t; \beta_t\}$, which are the parameters of translations, scale, and rotation angle, respectively. To predict the target state $s_t$, a transformation $F_{s_t}(p_i^o) \rightarrow p_i$ can be estimated using $P_C = \{(p_i^o, p_i)\}_{i=1}^{N_C}$. In order to avoid mistakes in matching and tracking key-points that may occur due to factors such as background clutter, rapid change in background, and the like, a RANSAC estimator is employed to compute the transformation. Specifically, according to one embodiment, the RANSAC estimator computes the transformation $F_{s_t}$ by randomly proposing putative solutions and identifying inliers and outliers. Additionally, the MLE-SAC estimator that works by maximizing the likelihood, rather than just the number of inliers can also be used.

Upon estimating the resulting transformation $F_{s_t}$, a target bounding box $B_t$ defined by the current state can be computed. A set of inlier key-points $p_I = \{(p_i)\}_{i=1}^{N_I}$, can also be obtained, where the number of inliers is important as they are evidence of a successful tracking operation. Specifically, the more inliers included in $F_{s_t}$, the more confident the result. Accordingly, a binary variable $G_C$ that indicates the tracking success can be set as:

$$G_C = \begin{cases} \text{True}, & N_I > \theta_I \\ \text{False}, & \text{otherwise} \end{cases}, \quad (8)$$

where $\theta_I$ is a predefined threshold controlling recall strictness.

In an exemplary embodiment of the multi-store tracker of the present disclosure, the long-term memory is progressively updated on the fly. Thus, it is important to consider cases of occlusion, wherein the entire target cannot be tracked successfully. Accordingly, the multi-store tracker can be configured to compute a set $P(B_t)$ which includes the key-points inside target bounding box $B_t$, and the set $P_O$ of occluding key-points, defined herein as the matched background key-points lying inside $B_t$, i.e., $P_O = P(B_t) \cap P_B$.

If there is no occlusion, then the number of occluding points $N_O = |P_O|$ is small i.e., close to zero. In contrast, when the target is occluded, the number of occluding key-points, $N_G = |P_G|$, is likely to be high and close to the number of key-points belonging to the target. In that case, the multi-store tracker computes the ratio of $N_O$ and $N_G$ and defines a binary variable $G_O$ that indicates occlusion occurrence as follows:

$$G_O = \begin{cases} \text{True}, & N_O/N_G > \theta_o \\ \text{False}, & \text{otherwise} \end{cases}, \quad (9)$$

where $P_G = P(B_t) \cap P_T$ are the matched target key-points inside the region of $B_t$.

The active set $P_A^t$ that stores the short-term memory can be updated at each image frame. It should be appreciated that the tracking of key-points when an occlusion is detected is detrimental as the key-points may gradually lock onto occluding objects or the background. Therefore, according to one embodiment, the multi-store tracker sets $P_A^t = \Phi$ (i.e., a null set) if $G_O$ is True, else it sets the active set $P_A^t = P_I$, which are the inliers found by the RANSAC estimator. However, when the target is stable or moving slowly, most of the key-points in the active set should be successfully tracked and identified as inliers, and meanwhile matched target key-points should be continually added to $P_A^t$.

In doing so, the active set $P_A^t$ may be very large and thus prove to be computationally inefficient. Therefore, according to one embodiment, the multi-store tracker determines redundant points in $P_A^t$ and lets the candidate set of RANSAC $P_C = P_T \cup (P_A^t \backslash P_R)$, wherein $P_R$ denotes the set of redundant key-points. The redundant points can be found using the quantization IDs. Specifically, a virtual grid can be built upon the original target template, and each target key-point can be assigned a quantization ID according to its corresponding coordinates $p_i^o$ in the original template. Finally, the redundant points in $P_A$ can be determined by searching the repetitive quantization IDs in $P_T$.

The use of key-points as the appearance model provisions for natural handling of in-plane rotation. However, it is important to update on the fly the appearance model to handle out-of-plane rotation, severe scale changes, and appearance variations of the target. To maintain relatively reliable memory of the target appearance, the memory database M is updated conservatively only when the short-term processing is confident about the result (i.e., $G_C$=True) and claims there is no occlusion ($G_O$=False). Note that both the target keypoint database Γ and the background keypoint database B need to be updated. Accordingly, in one embodiment, the multi-store tracker considers the unmatched points that are important for capturing any changes in visual structure. Specifically, during the update, the unmatched key-points that lie inside $B_l$ are added to Γ, and the key-points that lie outside $B_l$ are added to B, as follows:

$$\Gamma = \Gamma \cup (P_N \cap P(B_l))$$

$$B = B \cup (P_N \cap (P_D \setminus P(B_l))) \quad (10)$$

Similar to the human brain that is good at remembering, as well as forgetting, the remembering-forgetting interplay helps the multi-store tracker to effectively manage the valuable and finite memory capacity when handling massive quantities of input signals. In order to avoid the unbounded growth of the memory database M, a certain capacity is set for Γ and B, and the features are forgotten over time. Specifically, according to one embodiment, a forgetting curve model is employed to maintain M and forget unimportant features according to the retention of features.

The forgetting curve hypothesizes a decline in memory retention and shows how information is lost over time when there is no attempt to retain it. The memory retention r over time can be modeled using an exponential function:

$$r = \exp\left(-\frac{\tau}{\varphi h}\right) \quad (11)$$

where h is the relative strength of the memory, τ is the relative period of forgetting, and φ is a constant controlling the scale of the timespan.

Note that the speed of decline in memory retention is decided by the relative strength h. Further, for information with high relative strength h, the decline in memory retention becomes slow and it is increasingly more possible to be remembered over time. The relative strength of information can be increased using techniques such as repetitive retrieving. According to one embodiment, in the multi-store tracker, each feature in di∈M is assigned a set of memory variables ($r_i$; $\tau_i$; $h_i$), where the memory retention $r_i$ of features can be updated according to their corresponding $\tau_i$ and $h_i$ values.

In order to model the process of forgetting, during each update term, all relative periods $\tau_i$ of di∈M are increased by 1. Moreover, for the retrieved background features $d_k^{1\aleph} \in B$ where $d_k \in P_B$, and foreground features $d_k^{1\aleph} \in T$ where $d_k \in P_T \cap P_I$, the corresponding relative strength $h_i$ is increased by 1 and the relative period $\tau_i$ is set to 0. In doing so, the recalled features are renewed and strengthened in memory, while frequently recalled features obtain a high relative strength and are thus hard to forget. Once the number of features in the respective databases exceed a predefined memory capacity, $N_T > \Theta_T$ or $N_B > \Theta_B$, the features with low retention are removed and completely forgotten by the multi-store tracker.

Upon completing the processing procedures performed in the short-term processing portion and the long short-term processing portion of the multi-store tracker, the results of filtering $B_s$ (short-term processing portion) and the result of the long short-term processing $B_l$, together with the state variables $G_C$ and $G_O$ can be obtained by a controller. As stated previously, short-term filtering is accurate in relatively stable scenarios. Therefore, if the results of $B_s$ and $B_l$ are to some extent consistent (indicating that the long-term memory agrees with the output of the short term tracker), or the long-term component is not confident about the result ($G_C$=False), or an occlusion is detected ($G_C$=True), the tracking result $B_o$ is output as $B_o$=$B_s$, and the short-term filters are updated using $B_o$ and the predefined learning rates $\mu$=$\mu_o$ and $\gamma$=$\gamma_o$.

If the results of $B_s$ and $B_l$ are inconsistent, the tracking result is output as $B_o$=R($B_l$), where R(.) is a function for rotating a bounding box along its center and in the same orientation as $B_s$. Moreover, the short-term memory is refreshed using $B_o$ to update the short-term filters and the learning rates for γ and μ are set at 1. In doing so, the multi-store tracker cleans up all the previous short-term memory stored in the filters. In particular, according to one embodiment, the inconsistency of $B_s$ and $B_l$ are detected by the Intersection Over Union (IOU) metric $$U(B_s, B_l) = \left| \frac{B_s \cap B_l}{B_s \cup B_l} \right|$$

with a threshold of $\theta_U$. The IOU metric may be defined to have a value in the range from (0-1). Furthermore, the output of the short term processing portion and the output of the long short-term processing portion may be determined to be inconsistent when the computed IOU metric is below the threshold $\theta_U$.

Figure 3:
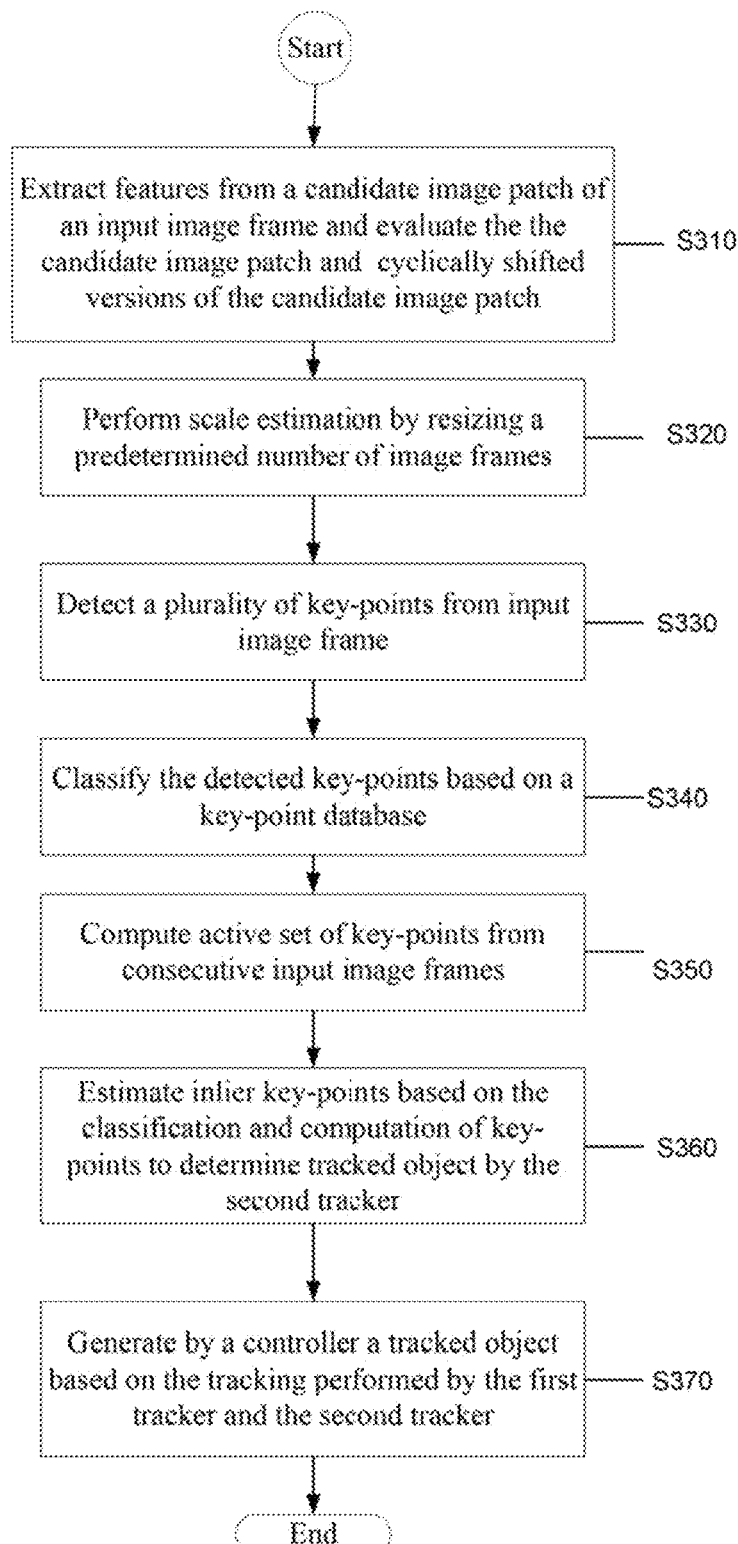
FIG. 3 illustrates an exemplary flowchart depicting the steps performed by the multi-store tracker to track an object.

FIG. 3 illustrates an exemplary flowchart depicting the steps performed by the multi-store tracker to track an object. The multi-store tracker includes a first object tracker and a second object tracker, which are respectively implemented by circuitry and work in a collaborative fashion to track the object. Specifically, the multi-store tracker includes a first tracker that is implemented in the short-term processing portion (denoted as 250 in FIG. 2) and a second tracker that is implemented in the long short-term processing portion (260 in FIG. 2) of the multi-store tracker framework.

In step S310, an input image frame is processed by the first tracker, wherein image features based on HOG descriptors (and color attributes) are extracted from a candidate image patch of the current image frame. The function of extracting the HOG descriptors from the image patches can be performed by the feature extraction circuit (block 203) of FIG. 2.

The first tracker evaluates the candidate image patch as well as cyclically shifted versions (image patches) of the candidate image patch. Further, the tracker evaluates the filtering response of the image patches in order to determine a location that has the highest filtering response. For instance, an integrated correlation filter (ICF), depicted as filtering circuitry (block 205 in FIG. 2) can be used to perform the filtering operation.

Subsequently, in step S320, the first tracker performs scale estimation of the tracked object. For instance, as stated previously, a DSSCF can be used for resizing a predetermined number of image patches that surround the location of the object as determined in step S310. Further, the first tracker outputs a first instance of the tracked object that is included in an image patch with the highest filtering response evaluated by the DSSCF.

The process further proceeds to step S330 wherein, a plurality of key-points from an input image frame are detected. According to an embodiment of the present disclosure, the key-points can be detected by the key-point detection circuit (block 209 in FIG. 2) included in the long short-term processing portion of the multi-store tracker. Further, the key-points may be characterized by SIFT descriptors that describe local features of the image.

In step S340, the detected key-points of step S330 are classified into one of a matched target key-point, matched background key-point, and an unmatched key-point. According to an embodiment of the present disclosure, the function of classification of the key-points can be performed by the matching circuit (block 211 in FIG. 2). Specifically, the classification of the key-points is performed based on a key-point database that includes a foreground (target) database and a background database. The foreground and background key-points are stored in the foreground database and background database, respectively.

Further, a detected key-point can be classified as a matched target key-point when a matching confidence of the detected key-point and a first nearest neighbor (included in the foreground database) of the detected key-point is above a predetermined threshold. In addition to the matching confidence, a ratio of distances parameter can be used to classify the detected key-point as a matched target key-point. Specifically, when the ratio of distances parameter (defined herein as a ratio of Euclidean distance of the detected key-point and the first nearest neighbor to the Euclidean distance of the detected key-point and the second nearest neighbor) is below a predetermined threshold, then the detected key-point can be classified as a matched target key-point. It should be appreciated that similar to the mechanism of classifying a detected foreground key-point, a detected background key-point can be classified as a matched background key-point as shown in equation (7).

The process then proceeds to step S350, wherein the key-point tracking circuit (block 213 in FIG. 2) computes an active set of key-points. The active set of key-points is computed based on consecutive input image frames. Specifically, the active set of key-points includes key-points whose coordinate displacement between the consecutive image frames is less than a predetermined threshold.

Upon computing the active set of key-points (step S350) and the matched target key-points (step S340), a RANSAC estimation circuit (block 215 in FIG. 2) determines inlier key-points that lie in a target bounding box (step S360). Note that the target bounding box corresponds to the tracked object as determined by the second tracker.

The process in step S370 generates an output response for object tracking. Specifically, the controller (block 217 in FIG. 2), that is implemented by circuitry, determines an output of the multi-store tracker (i.e., a tracked object), based on the consistency of the tracked object as determined by the first tracker and the second tracker, respectively. The process terminates after generating the tracked object. It must be appreciated that the steps of the flowchart as depicted in FIG. 3 are in no way restricted to be performed in a sequential manner. Specifically, according to an embodiment, the circuitry may perform the functions depicted in steps S310-S320, and the functions depicted in steps S330-S370 in a parallel manner.

Additionally, the circuitry of the multi-store tracker can be configured to update (for each input image frame) the active set of key-points that is used by the long short-term processing portion of the multi-store tracker. Specifically, the active set of key-points is updated by computing a redundant set of key-points based on quantization ID's and removing the computed redundant set from the active set of key-points.

Further, the circuitry of the multi-store tracker can be configured to update the key-point database when the number of inlier key-points (as estimated by the RANSAC estimator) is above a predetermined threshold and the number of matched background key-points lying within the target bounding box is close to zero i.e., there is no object occlusion.

The performance of the multi-store tracker can be determined by simulating the multi-store tracker on a computer system. The computer system may include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)). The computer system may be configured to execute software such as Matlab, C++ and the like.

In one instance, the parameters for the multi-store tracker were set as follows: $\theta_U=0$, the learning rate $\mu_o$ and $\gamma_o$ for the ICF are set to 0.01 and 0.02 respectively, and the padding size p in KCF is set to 1. The thresholds for matching key-points are set as $\theta_T=0.8$, $\theta_B=0.9$, $\theta_r=0.85$, and $\theta_f=8$. The threshold $\theta_{fb}$ for FB Tracker is set to 4. The parameter $\varphi$ in the forgetting curve model is set to 10, while the memory capacities $\Theta_T$ and $\Theta_B$ of the keypoint databases are both set to 2000.

The multi-store tracker can be evaluated on the Online Object Tracking Benchmark (OOTB): CVPR2013. The performance of the multi-store tracker is compared to a plurality of trackers (described below). The robustness of the trackers is compared based on two different metrics: the precision plot and the success plot. The precision plot corresponds to the percentage of successfully tracked frames on which the Center Location Error (CLE) of a tracker is within a given threshold $T_C$. Further, a representative precision score at $T_C=20$ is used for ranking the trackers. The success plot counts the percentage of successfully tracked frames, by measuring the Intersection Over Union (IOU) metrics for trackers on each frame. In one embodiment, for the success plot, the threshold of IOU is varied from 0 to 1, and the ranking of trackers is based on an Area Under Curve (AUC) score.

The performance of the multi-store tracker can be compared to twenty-nine (29) trackers whose performance results are available in OOTB. Specifically, the performance of the multi-store tracker (referred to herein as MUSTer) is compared to trackers such as: Structured output tracking with kernels (STRUCK), tracking learning detection (TLD), Sparsity based collaborative model tracker (SCM), Adaptive structural local sparse appearance model tracker (ASLA), visual tracking decomposition tracker (VTD), tracking by sampling trackers (VTS) and Multiple expert entropy minimization tracker (MEEM). Further, the performance of MUSTer can also be compared to correlation filter-based trackers CN, KCF, and DSST, as well as an integrated correlation filter (ICF) tracker so as to demonstrate the importance of the long-term tracking component in MUSTer.

Figure 4A:
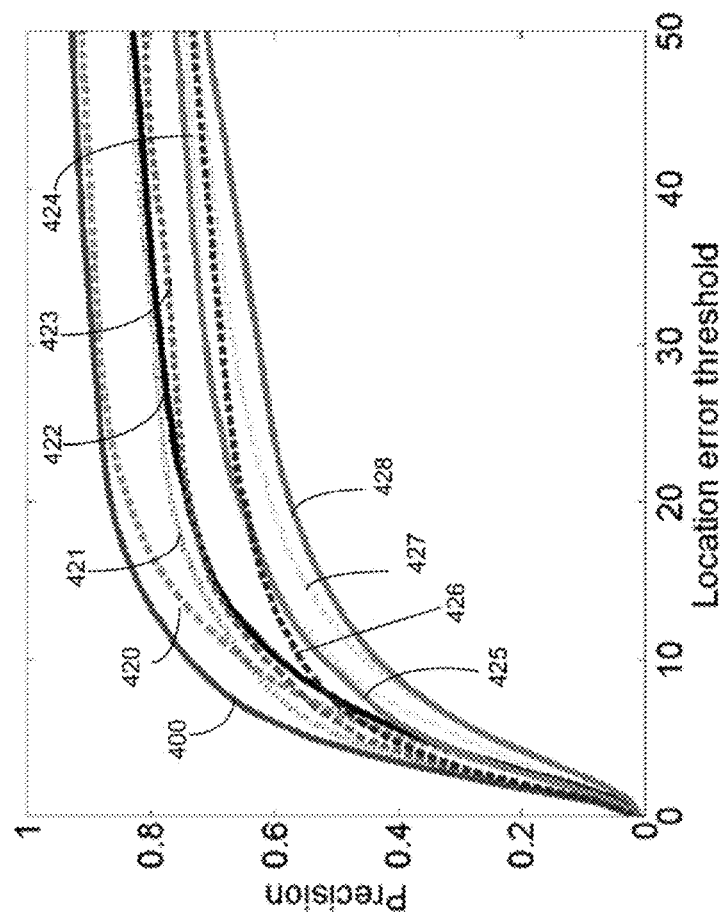
FIGS. 4A and 4B depict exemplary graphs illustrating the performance of the multi-store tracker.
Figure 4B:
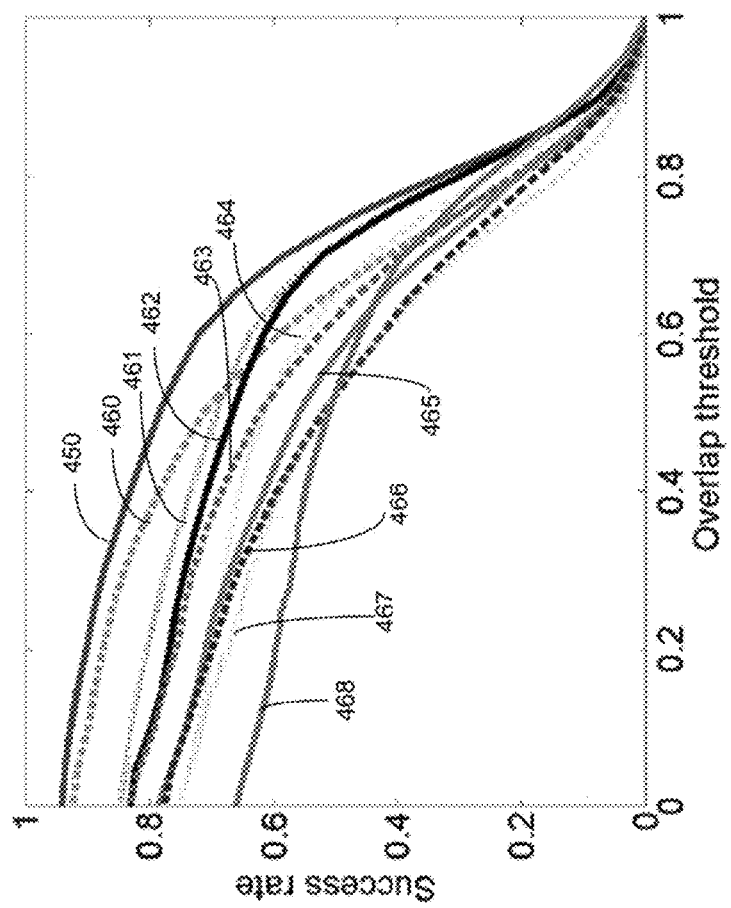

FIGS. 4A and 4B depict graphs illustrating performance of the multi-store tracker compared to other trackers. Specifically, FIG. 4A illustrates a graph depicting precision plots of the trackers and FIG. 4B illustrates a graph depicting success plots of the trackers that correspond to the percentage of successfully tracked frames.

In FIG. 4A, the curve 400 corresponds to the performance of MUSTer while curves 420-428 correspond to the performance of MEEM, ICF, KCF, DSST, CN, Struck, SCM, TLD, and VTS trackers, respectively. In FIG. 4B, the curve 450 corresponds to the performance of MUSTer, while curves 460-468 correspond to the performance of MEEM, ICF, DSST, KCF, SCM, Struck, CN, TLD, and ASLA trackers, respectively. Note that as stated previously, the performance of MUSTer is compared to the performance of twenty-nine (29) trackers that are available in OOTB. However, for the sake of clarity, only the performance of the top ten trackers is depicted in FIGS. 4A and 4B.

FIGS. 4A and 4B indicate that MUSTer achieves the overall best performance using both the metrics (precision and success plot), and significantly outperforms the second best tracker (MEEM) with an 11% performance gain using the metric of the AUC score. The AUC scores of the trackers for the precision plot and success plot are depicted below in Tables I and II, respectively. It should be appreciated that the AUC score that measures the overall performance in a success plot is more accurate than the precision score at one threshold of a precision plot. Accordingly, the results as depicted in FIGS. 4A and 4B clearly demonstrate the superior performance of MUSTer. Additionally, MUSTer also significantly outperforms the baseline short-term component ICF tracker, other correlation filter based trackers (DSST and KCF), and the long-term tracker TLD, thereby validating the important role of the long-term component in MUSTer and the effectiveness of the MUSTer framework that is based on ASMM. In other words, FIGS. 4A and 4B illustrate the benefit of incorporating a short-term, as well as a long term component in the MUSTer framework that collaboratively process the input image to track the object.

The performance of MUSTer was also evaluated on the ALOV++ (Amsterdam Library of Ordinary Videos) platform. ALOV++ includes fourteen (14) challenge subsets, and a total of three hundred fifteen (315) sequences that are used to systematically evaluate a trackers' robustness for a large variety of situations including light changes, low contrast, occlusion and the like. In order to evaluate the performance of the trackers, a survival score that is based on an F-score is computed in order to evaluate the trackers' robustness. To obtain the survival score of a tracker, the F-score for each video is computed as:

$$F=2(\text{precision} \times \text{recall})/(\text{precision}+\text{recall}) \quad (12)$$

wherein, the parameters precision and recall are computed as: $\text{precision}=n_{tp}/(n_{tp}+n_{fp})$, and $\text{recall}=n_{tp}/(n_{tp}+n_{fn})$, and $n_{tp}$, $n_{fp}$, $n_{fn}$ respectively denote the number of true positives, false positives and false negatives in a video. Note that the survival curve shows the performance of a tracker on all videos in the dataset.

Figure 5:
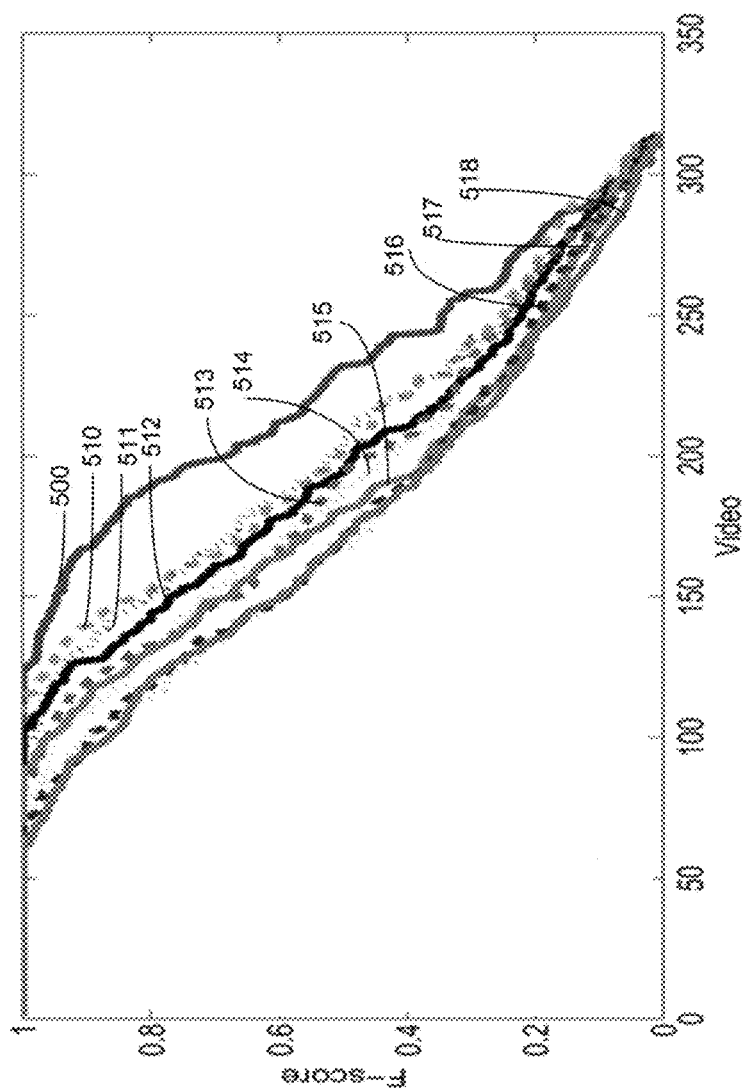
FIG. 5 depicts a graph illustrating a comparison of an F-score of the multi-store tracker and other trackers.

The performance of MUSTer was compared to the performance of nineteen (19) trackers. FIG. 5 depicts the performance (F-score) of the MUSTer compared to the following nine (9) trackers: MEEM tracker, a foreground-background texture discriminating (FBT) tracker, VTS tracker, TLD tracker, L1O tracker (i.e., an L1 tracker with occlusion detection), normalized cross-correlation tracker (NCC), multiple instance learning (MIL) tracker, and LIT tracker (i.e., a tracker employing sparse representation). Note that in the graph of FIG. 5, for the sake of clarity, only the performance of the top 10 trackers is depicted.

In FIG. 5, curve 500 depicts the performance of MUSTer, while curves 510-518 depict the performance of the Struck, MEEM, FBT, VTS, TLD, L1O, NCC, MIL, and LIT tracker's, respectively. The results depicted in FIG. 5 indicate that MUSTer achieves the best overall performance as compared to the other trackers. Further, as depicted in Table III below, the average F-score of MUSTer on ALOV++ is 0.73, which is significantly better than Struck (0.66), MEEM (0.65), TLD (0.61) and the other trackers.

TABLE I

Performance score for quantitative comparison of precision ($T_C = 20$).

| MUSTer | MEEM | ICF | KCF | DSST | CN | Struck | SCM | TLD | VTS |
|---|---|---|---|---|---|---|---|---|---|
| 0.865 | 0.835 | 0.767 | 0.740 | 0.737 | 0.661 | 0.656 | 0.649 | 0.608 | 0.575 |

TABLE II

Performance score for quantitative comparison of success plots (AUC).

| MUSTer | MEEM | ICF | DSST | KCF | SCM | Struck | CN | TLD | ALSA |
|---|---|---|---|---|---|---|---|---|---|
| 0.641 | 0.576 | 0.572 | 0.554 | 0.514 | 0.499 | 0.474 | 0.453 | 0.437 | 0.434 |

TABLE III

Average F-scores of trackers over 315 video sequences.

| MUSTer | Struck | MEEM | FBT | VTS | TLD | L10 | NCC | MIL | L1T |
|---|---|---|---|---|---|---|---|---|---|
| 0.73 | 0.66 | 0.65 | 0.64 | 0.62 | 0.61 | 0.60 | 0.57 | 0.57 | 0.56 |

Each of the functions of the described embodiments may be implemented by one or more processing circuits. A processing circuit includes a programmable processor (for example, processor 603 in FIG. 6). A processing circuit also can be embodied as an application-specific integrated circuit (ASIC) and conventional circuit components arranged to perform the recited functions.

Figure 6:
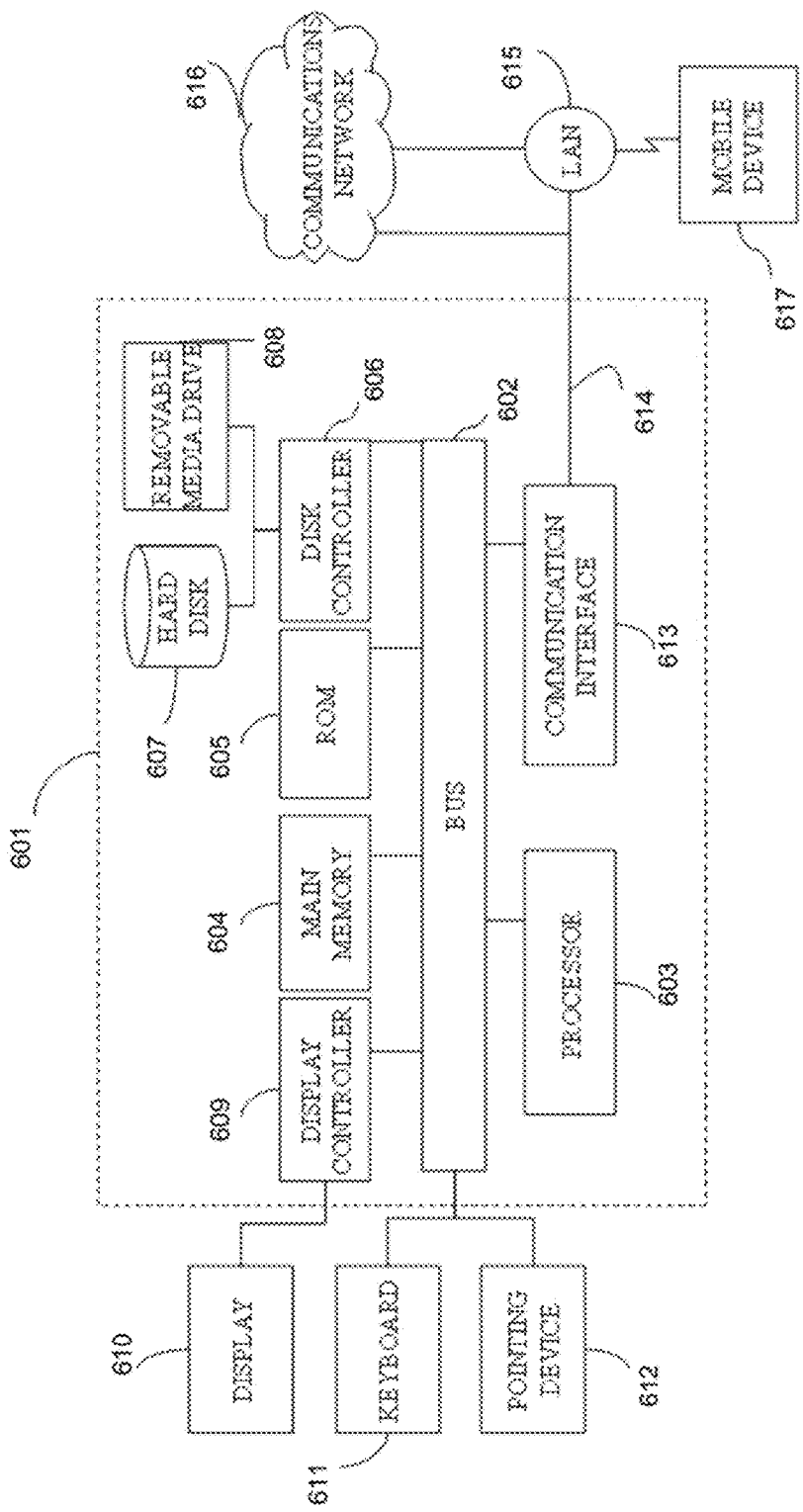
FIG. 6 illustrates a block diagram of a computing device according to one embodiment.

The various features discussed above may be implemented by a computer system (or programmable logic). FIG. 6 illustrates such a computer system 601. The computer system 601 of FIG. 6 may be a general-purpose computer or a particular, special-purpose machine. In one embodiment, the computer system 601 is a particular, special-purpose machine when the processor 603 is programmed to perform object tracking.

The computer system 601 includes a disk controller 606 coupled to the bus 602 to control one or more storage devices for storing information and instructions, such as a magnetic hard disk 607, and a removable media drive 608 (e.g., floppy disk drive, read-only compact disc drive, read/write compact disc drive, compact disc jukebox, tape drive, and removable magneto-optical drive). The storage devices may be added to the computer system 601 using an appropriate device interface (e.g., small computer system interface (SCSI), integrated device electronics (IDE), enhanced-IDE (E-IDE), direct memory access (DMA), or ultra-DMA).

The computer system 601 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 601 may also include a display controller 609 coupled to the bus 602 to control a display 610, for displaying information to a computer user. The computer system includes input devices, such as a keyboard 611 and a pointing device 612, for interacting with a computer user and providing information to the processor 603. The pointing device 612, for example, may be a mouse, a trackball, a finger for a touch screen sensor, or a pointing stick for communicating direction information and command selections to the processor 603 and for controlling cursor movement on the display 610.

The processor 603 executes one or more sequences of one or more instructions contained in a memory, such as the main memory 604. Such instructions may be read into the main memory 604 from another computer readable medium, such as a hard disk 607 or a removable media drive 608. One or more processors in a multi-processing arrangement may also be employed to execute the sequences of instructions contained in main memory 604. In alternative embodiments, hard-wired circuitry may be used in place of or in combination with software instructions. Thus, embodiments are not limited to any specific combination of hardware circuitry and software.

As stated above, the computer system 601 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 601, for driving a device or devices for implementing the features of various embodiments described herein, and for enabling the computer system 601 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 603 for execution. A computer readable medium may take many forms, including but not limited to, non-volatile media or volatile media. Non-volatile media includes, for example, optical, magnetic disks, and magneto-optical disks, such as the hard disk 607 or the removable media drive 608. Volatile media includes dynamic memory, such as the main memory 604. Transmission media, on the contrary, includes coaxial cables, copper wire and fiber optics, including the wires that make up the bus 602. Transmission media also may also take the form of acoustic or light waves, such as those generated during radio wave and infrared data communications.

Various forms of computer readable media may be involved in carrying out one or more sequences of one or more instructions to processor 603 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 601 may receive the data on the telephone line and place the data on the bus 602. The bus 602 carries the data to the main memory 604, from which the processor 603 retrieves and executes the instructions. The instructions received by the main memory 604 may optionally be stored on storage device 607 or 608 either before or after execution by processor 603.

The computer system 601 also includes a communication interface 613 coupled to the bus 602. The communication interface 613 provides a two-way data communication coupling to a network link 614 that is connected to, for example, a local area network (LAN) 615, or to another communications network 616 such as the Internet. For example, the communication interface 613 may be a network interface card to attach to any packet switched LAN. As another example, the communication interface 613 may be an integrated services digital network (ISDN) card. Wireless links may also be implemented. In any such implementation, the communication interface 613 sends and receives electrical, electromagnetic or optical signals that carry digital data streams representing various types of information.

The network link 614 typically provides data communication through one or more networks to other data devices. For example, the network link 614 may provide a connection to another computer through a local network 615 (e.g., a LAN) or through equipment operated by a service provider, which provides communication services through a communications network 616. The local network 614 and the communications network 616 use, for example, electrical, electromagnetic, or optical signals that carry digital data streams, and the associated physical layer (e.g., CAT 5 cable, coaxial cable, optical fiber, etc.). The signals through the various networks and the signals on the network link 614 and through the communication interface 613, which carry the digital data to and from the computer system 601 may be implemented in baseband signals, or carrier wave based signals.

The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 601 can transmit and receive data, including program code, through the network(s) 615 and 616, the network link 614 and the communication interface 613. Moreover, the network link 614 may provide a connection through a LAN 615 to a mobile device 617 such as a personal digital assistant (PDA) laptop computer, or cellular telephone.

While aspects of the present disclosure have been described in conjunction with the specific embodiments thereof that are proposed as examples, alternatives, modifications, and variations to the examples may be made. It should be noted that, as used in the specification and the appended claims, the singular forms "a," "an," and "the" include plural referents unless the context clearly dictates otherwise.

What is claimed is:

1. An object tracking device comprising:
circuitry configured to:
perform a short-term object tracking process to track an object from an input image;
perform a long-term object tracking process to track the object from the input image;
compare a result of the short-term object tracking process with a result of the long-term object tracking process to determine a consistency between the result of the short-term object tracking process and the result of the long-term object tracking process; and
generate a tracked object based on the consistency between the result of the short-term object tracking process and the result of the long-term object tracking process,
wherein
the short-term object tracking process includes a filtering process and tracks the object based on short-term memory and spatiotemporal consistency, and
the long-term object tracking process performs key-point matching-tracking and RANSAC estimation based on flexibility and shape generalizability of key-point based appearance models.

2. The object tracking device of claim 1, wherein the circuitry is configured to use the short-term memory to provide instant responses to the input image.

3. The object tracking device of claim 1, wherein the circuitry is configured to update the short-term memory based upon an output of the long-term object tracking process.

4. The object tracking device of claim 1, wherein the circuitry is configured to interact with the short-term memory to perform the long-term tracking process.

5. The object tracking device of claim 1, wherein
the circuitry further includes a long-term memory, and
the circuitry is configured to perform the long-term tracking process using the long-term memory.

6. An object tracking method comprising:
performing a short-term object tracking process to track an object from an input image;
performing a long-term object tracking process to track the object from the input image;
comparing a result of the short-term object tracking process with a result of the long-term object tracking process to determine a consistency between the result of the short-term object tracking process and the result of the long-term object tracking process; and
generating a tracked object based on the consistency between the result of the short-term object tracking process and the result of the long-term object tracking process,
wherein
the short-term object tracking process includes a filtering process and tracks the object based on short-term memory and spatiotemporal consistency, and
the long-term object tracking process performs key-point matching-tracking and RANSAC estimation based on flexibility and shape generalizability of key-point based appearance models.

7. The object tracking method according to claim 6, wherein performing the short-term object tracking process includes using the short-term memory to provide instant responses to the input image.

8. The object tracking method according to claim 6, further comprising updating the short-term memory based upon an output of the long-term object tracking process.

9. The object tracking method of claim 6, further comprising interacting with the short-term memory to perform the long-term tracking process.

10. The object tracking method of claim 6, wherein performing the long-term object tracking process includes:
using a long-term memory.

11. A non-transitory computer readable medium having stored thereon a program that when executed by a computer causes the computer to execute a method to track an object, the method comprising:
performing a short-term object tracking process to track an object from an input image;

performing a long-term object tracking process to track the object from the input image;

comparing a result of the short-term object tracking process with a result of the long-term object tracking process to determine a consistency between the result of the short-term object tracking process and the result of the long-term object tracking process; and generating a tracked object based on the consistency between the result of the short-term object tracking process and the result of the long-term object tracking process, wherein the short-term object tracking process includes a filtering process and tracks the object based on short-term memory and spatiotemporal consistency, and the long-term object tracking process performs key-point matching-tracking and RANSAC estimation based on flexibility and shape generalizability of key-point based appearance models.

12. The object tracking device of claim 1, wherein:

the short-term memory includes a filtering circuit that provides the filtering process, and the circuitry is configured to reset the filtering circuit when an output of the short-term tracking process is highly inconsistent with the output of the long-term tracking process.

13. The object tracking device of claim 12, wherein the filtering process is a two-stage process and the short-term tracking process is highly inconsistent with the output of the long-term tracking process when the object is substantially occluded, leaves a field of view, or is rotated.

14. The object tracking method of claim 6, wherein:

the short-term memory includes a filtering circuit that provides the filtering process, and the circuitry is configured to reset the filtering circuit when an output of the short-term tracking process is highly inconsistent with the output of the long-term tracking process.

15. The object tracking method of claim 14, wherein the filtering process is a two-stage process and the short-term tracking process is highly inconsistent with the output of the long-term tracking process when the object is substantially occluded, leaves a field of view, or is rotated.

* * * * *